No. 627,616. Patented June 27, 1899.
C. A. HILL.
PNEUMATIC TIRE.
(Application filed Oct. 31, 1898.)
(No Model.)
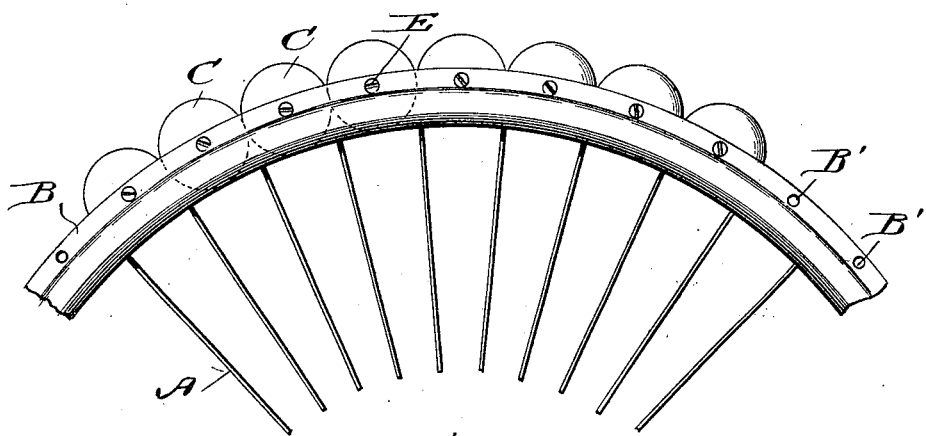
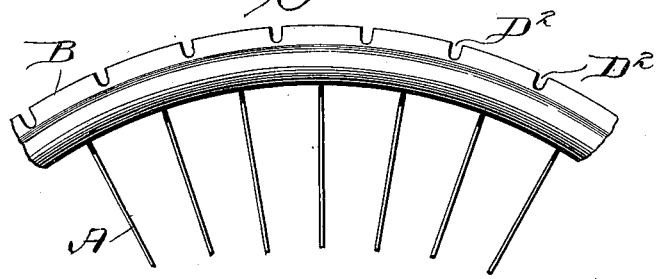
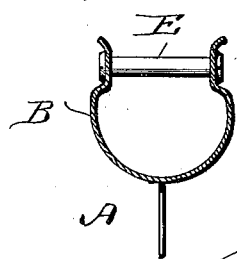
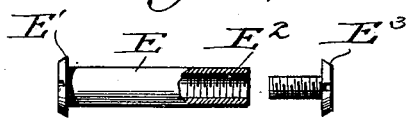
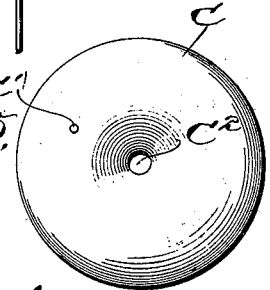
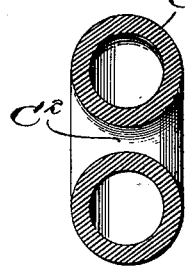
Witnesses
Inventor
Clement A. Hill
by W. H. Babcock
Attorney

UNITED STATES PATENT OFFICE.

CLEMENT ARTHUR HILL, OF HULL, ENGLAND.

PNEUMATIC TIRE.

SPECIFICATION forming part of Letters Patent No. 627,616, dated June 27, 1899.

Application filed October 31, 1898. Serial No. 695,038. (No model.)

*To all whom it may concern:*

Be it known that I, CLEMENT ARTHUR HILL, a citizen of Great Britain, residing at Hull, in the county of York, England, have invented certain new and useful Improvements in Pneumatic Tires; and I do hereby declare the following to be a full, clear, and exact description of the invention, such as will enable others skilled in the art to which it appertains to make and use the same.

The object of this invention is to provide an efficient pneumatic tire for bicycles, motorcars, and other vehicles, consisting of independent annular sections, which construction obviates to a large extent the evil effects of puncture and may be easily repaired by replacing a punctured or damaged section by a new and sound one without disturbing the other sections of the tire.

To this end the said invention consists in the construction and combination of parts hereinafter more particularly set forth and claimed.

In the accompanying drawings, Figure 1 represents a side elevation of part of a bicycle-wheel embodying my invention. Fig. 2 represents a similar view of the same with the tire removed. Fig. 3 represents a detail cross-section, enlarged, through the trough-shaped rim, a part of one of the spokes being shown attached thereto and the support for one of the sections of the tire being indicated by dotted lines. Fig. 4 represents the said support or tubular axle for a tire-section or ring and the screw for fastening the same to the said rim. Fig. 5 represents a side elevation of one of the said rings or tire-sections, and Fig. 6 represents a central cross-section through the same.

A designates the spokes of the wheel; B, the trough-shaped metal rim attached thereto; C, a series of rubber pneumatic rings or annular sections arranged in said trough-shaped rim and having their diameters in the plane of motion of the wheel and their peripheries in contact all around it, these rings being arranged rim to rim and not crosswise, in order that the horizontal forward and backward expansion of each ring under pressure may compress the proximate rings, increasing the elasticity of the continuous rubber tire, which is composed of the said circular series of continuous rings. The latter are not connected internally or externally to each other, so that any one of the said rings or annular sections may be removed in case of injury without dislodging the others of the series and so that no puncture of any one of said sections will cause the air to escape from any other. Each of these sections, as shown in Fig. 6, consists of a circular rubber tube, which is inflated through an opening C' by any convenient means, such as now are commonly employed for similar purposes, the said opening being sealed after inflation. Each of these sections is provided with a central opening $C^2$ for the passage of the support or axle on which it turns. These rubber rings or sections are secured independently and detachably, with freedom of independent rotation, within the trough-shaped rim B, preferably by means of a rod or axle E, which extends transversely through the hole $C^2$ of the said section and also through holes B', Fig. 1, or slots $D^2$, Fig. 2, in the side walls of the said rim. As shown in Fig. 4, the said rod or axle is provided with a head E' at one end and with internal screw-threads $E^2$ at the other, the bore of said threads being extended to the said head, so as to make the interior of the rod hollow for the sake of lightness. A headed screw $E^3$ engages the said threads and binds against the exterior of the said rim, holding the said rod in place. These rods constitute secure supports or means of attachment for the said rings or sections, but allow their perfect freedom of rotation and great ease of removal individually.

I do not confine myself to the particular materials mentioned. It is best to make the rim of the wheel of a single strip of steel having its edges turned slightly outward or beaded on the edges to prevent friction or cutting of the tire. It may, however, be formed of wood or other material having the requisite strength and rigidity. For the tire-sections rubber is practically the only really satisfactory material now in use; but the substitution of any other substance having the requisite flexibility, resiliency, and adaptation to inflation and pneumatic service would not avoid the scope of my invention.

Instead of using the detachable rods E or similar devices passing through the rim and through the tire-sections transversely the side walls of the rim may be provided with indentations or inwardly-presented bearing-points which enter from opposite sides the central holes $E^2$ of the rings or sections E and support the same detachably.

The use of an outer covering for the tire is not necessary; but any ordinary and convenient form thereof may be employed, if desired. For heavy vehicles the said rings or sections may have thickened walls corresponding more nearly to the cushion type of tire. The independent rotatability of the sections E lessens friction and increases the resiliency of the tire.

Having thus described my invention, what I claim as new, and desire to secure by Letters Patent, is—

1. A pneumatic tire consisting of a series of independently-detachable, pneumatic, resilient rings arranged rim to rim in the plane of motion of the wheel, substantially as set forth.

2. A pneumatic tire consisting of a series of independent, pneumatic, resilient rings, in combination with means of support allowing their individual rotation, substantially as set forth.

3. In combination with the trough-shaped rim of a wheel, a pneumatic tire arranged therein and consisting of a series of independent, resilient, pneumatic rings, having their peripheries in contact with each other and their diameters in the plane of motion of the wheel, and means for fastening the said rings therein while allowing their individual removal, substantially as set forth.

4. In combination with the trough-shaped rim B of a wheel, having openings in its side walls, a series of rods passing transversely through said openings and rim, means for detachably securing the said rods in this position, consisting of a screw turned into the screw-tapped end of each rod and a series of annular, resilient, pneumatic tire-sections, mounted individually on the said rods within the said trough-shaped rim and having no connection with each other, substantially as set forth.

5. In combination with the trough-shaped wheel-rim B, a pneumatic tire consisting of a series of rubber annular sections E, arranged within said rim and in contact with each other so as to form a continuous series of sections arranged with their peripheries in contact and their diameters in the plane of motion of the wheel and having no connection between their independent interiors, substantially as set forth.

In testimony whereof I affix my signature in presence of two witnesses.

CLEMENT ARTHUR HILL.

Witnesses:
JOSEPH COWLEY,
CHARLES ALBERT MANNING.